United States Patent [19]

Damico

[11] 3,713,094
[45] Jan. 23, 1973

[54] AUTOMATIC VEHICLE ALERTING SIGNAL SYSTEM

[76] Inventor: Armand S. Damico, 65-15 79th Place, Middle Village, N.Y.

[22] Filed: Feb. 20, 1970

[21] Appl. No.: 13,148

Related U.S. Application Data

[63] Continuation-in-part of Ser. No. 578,764, Sept. 12, 1966, Pat. No. 3,497,871.

[52] U.S. Cl. ................................340/66, 340/87
[51] Int. Cl. ..............................................B60q 1/50
[58] Field of Search..........................340/66, 71, 72

[56] References Cited

UNITED STATES PATENTS

| | | | |
|---|---|---|---|
| 2,750,578 | 6/1956 | Petrella et al. | 340/66 |
| 3,304,381 | 2/1967 | McAnespey | 340/71 UX |
| 3,336,450 | 8/1967 | Rainer | 200/61.89 |
| 3,395,388 | 7/1968 | Hendrickson | 340/71 |
| 2,698,403 | 12/1954 | Woodham | 340/66 X |
| 2,442,971 | 6/1948 | Chessrown | 340/66 X |
| 2,692,960 | 10/1954 | Keegin | 340/69 X |
| 2,066,267 | 12/1936 | Hayes | 340/52 UX |
| 3,424,411 | 10/1969 | Callins | 340/87 |
| 2,731,584 | 1/1956 | Onksen | 340/67 X |
| 3,215,979 | 11/1965 | Ryan | 340/66 |
| 3,244,934 | 4/1966 | Webb | 340/67 X |
| 3,304,540 | 2/1967 | McAnespey | 340/71 |
| 3,434,106 | 3/1969 | Lawless | 340/67 X |
| 3,461,425 | 8/1969 | Schultz et al. | 340/71 |
| 3,497,871 | 2/1970 | Damico | 340/71 |

FOREIGN PATENTS OR APPLICATIONS

| | | | |
|---|---|---|---|
| 1,165,760 | 6/1958 | France | 340/66 |

*Primary Examiner*—John W. Caldwell
*Assistant Examiner*—Kenneth N. Leimer
*Attorney*—Lilling & Siegel

[57] ABSTRACT

The present invention pertains to an alerting signal system for indicating the operating condition of a motor vehicle to apprise drivers rearwardly of the vehicle of the condition and actions of the vehicle and which may utilize the existing tail illuminating lights or lamps and other lamps to indicate the operating condition of the vehicle and any changes thereof. The two filaments of a dual filament bulb are employed in combination with coupling means, an ignition switch and an accelerator such that when the ignition switch is on, one of said filaments is illuminated; and when the other of said filaments is illuminated, said first one of said filaments is turned off and there is an indication only that said ignition switch is on and the accelerator is supplying fuel to the vehicle's engine.

3 Claims, 7 Drawing Figures

INVENTOR
ARMAND S. DAMICO
BY
Lilling and Siegel
ATTORNEYS

AUTOMATIC VEHICLE ALERTING SIGNAL SYSTEM

CROSS-REFERENCE TO RELATED APPLICATION

This application is a continuation-in-part application of applicant's copending application Ser. No. 578,764, filed Sept. 12, 1966, now U.S. Pat. No. 3,497,871.

BACKGROUND OF THE INVENTION

This invention relates generally to signal systems for automotive vehicles, and is especially concerned with a unique and highly improved signal system for alerting drivers in the vicinity of other vehicles concerning the presence thereof and the contemplated action of vehicles being observed.

As is well known to those versed in the art, existing automotive signal systems have proved entirely inadequate in present-day conditions of high speed and congested traffic. That is, automotive improvements in higher speed, greater power, ease of operation, and others, have served only to add to traffic problems and create higher numbers of accidents. An important reason for the high accident rate is the absence of adequate signaling between vehicles, whereby a driver may obtain more early warning of the action of a proximate vehicle.

SUMMARY OF THE INVENTION

Accordingly, it is an important object of the present invention to provide a signaling system for automotive vehicles which effectively alerts drivers of adjacent vehicles to the condition and potential action of a vehicle carrying the instant alerting system.

It is a more particular object of the present invention to provide an alerting signaling system for automotive vehicles wherein the mere turning on or closing of the ignition switch is indicated to adjacent drivers, and wherein the incipient deceleration resulting from deactuation of the carburetor is instantaneously communicated to adjacent drivers, as well as to pedestrians in the rear of said vehicle, and wherein alternate actuation and deactuation of the acceleration mechanism is most attractively signaled to adjacent drivers, because of the illusion of a moving light or of flashing lights as requiring most attention.

The instant invention more particularly contemplates the provision of signal means for automotive vehicles effectively automatically signaling to adjacent drivers that the motor is running or should be running, as well as providing incidental advantages in signaling to a car owner that the ignition key had not been removed when the car is stopped whether the motor is inadvertently left running or is not running, thus preventing the accidental or deliberate operation of a vehicle without tail or rear lights in violation of the law, as well as accidental death by asphyxiation, as in a domestic garage or adjacent residence.

It is still a further object of the present invention to provide an automotive signaling system having the advantageous characteristics mentioned in the preceding paragraphs which is extremely simple in construction, durable and reliable throughout a long useful life, and which can be economically manufactured and installed for sale at a reasonable price.

In accordance with still another feature of the present invention, provision is made for housing the warning lamps either in a single housing or in two separate housings. When in a single housing a dual filament lamp is utilized with differing light intensities produced by each filament. In particular, when the ignition switch is energized, a first pair of light sources or filaments located on opposite sides of the rear of an automobile is also energized to a first intensity while when the accelerator mechanism is actuated, a second pair of light sources, separated from each other at the rear of the automobile, is energized. One of the first pair of light sources and of the second pair of light sources may be combined in a single housing as the above described dual filament lamp while the second light sources of the pairs may be combined in a second dual filament lamp.

As still another feature of the present invention, the accelerator mechanism causes a relay to switch from a first to a second position. An advantage of using a relay resides in the fact that higher switching currents may be carried by the relay contacts than has been previously accommodated by the more simple single sole type switching mechanisms.

Other objects of the present invention will become apparent upon reading the following specification and referring to the accompanying drawings, which form a material part of this disclosure.

DESCRIPTION OF THE PREFERRED EMBODIMENT

FIGS. 1 through 6 illustrate various embodiments and uses for the automatic vehicle alerting signal system.

Figure 1:
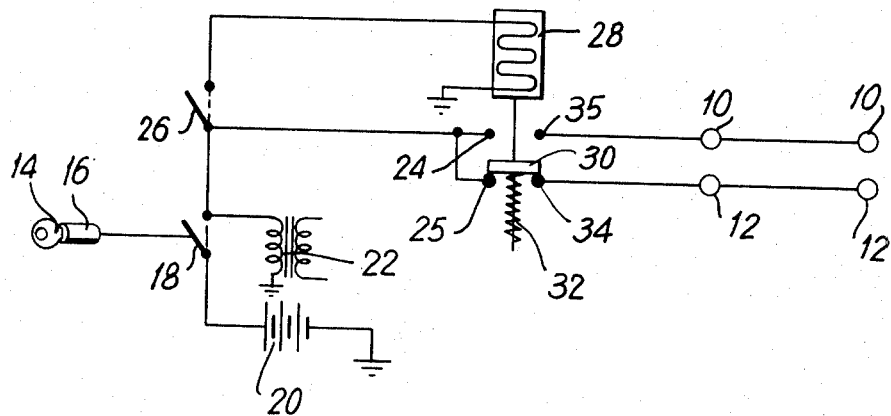
FIG. 1 is a schematic diagram of an automotive signaling system in accordance with the teachings herein.

FIG. 1 illustrates one embodiment of such an alerting system utilizing a relay as an operative member of the system. A first pair of warning lamps 10–10 provides a visual indication of the depression of an accelerator mechanism of the automobile while a second pair of warning lamps 12–12 provides a visual indication that the ignition switch is energized. Preferably, warning lamps 10 and 12 would be located on the rear of an automobile to provide the desired warning to contiguous pedestrians and adjacent automobiles. When the ignition key 14 is inserted in the lock 16 and turned, a switch 18 is displaced from its normal open position to a closed position. One contact of switch 18 is connected through a battery source 20 to a point of reference potential while the other contact of switch 18 is connected to one end of the ignition coil 22. This latter contact of switch 18 is also connected to a pair of contacts 24-25 and to one contact of a switch 26 operated by depression of the accelerator pedal. When the accelerator is in its normal rest position, switch 26 is open, while when the accelerator is depressed, switch 26 is closed. The second contact of switch 26 is connected to one end of a relay or solenoid 28 while the other end of the coil of relay or solenoid 28 is connected to ground. A plunger mechanism 30 held in a normally down position by spring 32 abutting contact 25 and another contact 34 completes an electrical path to energize lamps 12. When the solenoid is energized, that is when the plunger is raised from its lower position and drawn to its upper position, it abuts contact 24 and a contact 35 which completes the electrical path to energize lamps 10.

When the automobile is at rest with the ignition key 14 out of engagement with lock 16, switch 18 is in its open position, thereby preventing electrical current from being distributed to the alerting signal system of the present invention. When ignition key 14 energizes the ignition system, switch 18 is closed permitting current supplied by battery source 20 to pass through the lower pair of contacts 25 and 34 bridged by plunger member 30 to warning lamps 12. Therefore, it may be seen while the motor is idling, warning lamps 12 provide a corresponding indication of that condition.

When the accelerator mechanism is depressed, switch 26 is closed thereby energizing solenoid or relay 28 causing the plunger 30 to be removed from lower contacts 25 and 34 and to bridge contacts 24 and 35. When the plunger is in this latter position, electrical current is supplied by battery 20 through switch 18, upper contact 24, plunger member 30, and upper contact 35, to warning lamps 10—10. Warning lamps 12—12 are prevented from receiving power when the plunger is in its up position, thereby insuring that only one or the other of the pairs of signaling lamps will be energized at a time.

It may be appreciated that large amperage may be accommodated by the plunger and contact mechanism illustrated in FIG. 1 to provide the requisite amount of current required to energize the warning lamps. In the prior art, occasionally high amperage requirements would cause associated switches to operate in a faulty manner.

Figure 2:
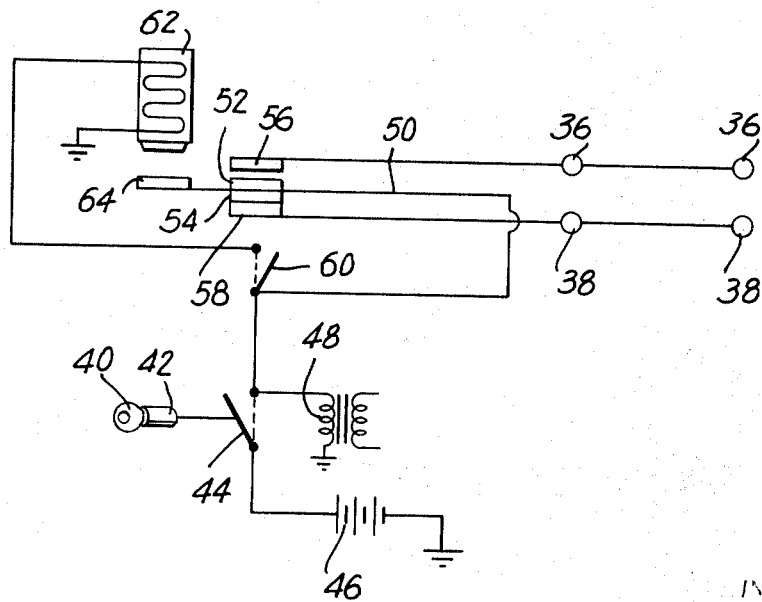
FIG. 2 is a schematic diagram of a further embodiment of automotive signaling system in accordance with the present invention.

FIG. 2 illustrates yet another embodiment of the principles of the present invention utilizing a solenoid or relay. A first pair of warning lamps 36—36 provides a visual indication when the accelerator mechanism of an automobile is depressed, while a second pair of warning lamps 38—38 provides a visual indication that the motor is running. When the ignition key 40 is inserted in the ignition key receptacle 42 and turned, a switch 44 is displaced from its normally open position to a closed position. One contact of switch 44 is connected through a battery source 46 to a point of reference potential, while the other contact of switch 44 is connected to one end of the ignition coil 48. This latter contact of switch 44 is also connected to a contact arm 50 having a first contact 52 located on the top side of the contact arm and a second contact 54 located on the under side of contact arm 50. A contact 56 capable of being abutted by contact 52 is connected to warning lamps 36—36 while another contact 58 capable of being touched by contact 54 is connected to the second pair of warning lamps 38—38. The latter contact of switch 44 is also connected to one contact of a switch 60 responsive to the position of the accelerator pedal, while the other contact of switch 60 is connected to a solenoid or relay 62. A magnetically attractable member 64 is located on the distal end of contact arm 50 and is magnetically attracted to solenoid 62 when it is energized.

The operation of the embodiment shown in FIG. 2 is somewhat similar to that described above with reference to FIG. 1, where when the switch 44 controlled by ignition key 40 is closed, the first pair of warning lamps 38—38 is energized. A complete electrical path is formed between the source of electrical power 46 and warning lamps 38—38 through closed switch 44, conducting arm 50 and touching contacts 54 and 58. In its normal rest position, contact arm 50 causes contacts 54 and 58 to abut each other, while when the accelerator mechanism is depressed, switch 60 is closed energizing the solenoid 62, pulling up the contact arm 50, causing contacts 52 and 56 to touch thereby delivering electrical power to warning lamps 36—36.

Warning lamps 10—10, 12—12 of FIG. 1 and 36—36 and 38—38 of FIG. 2 may be self-contained lighting systems or merely light sources, such as a lamp filament.

Figure 3A:
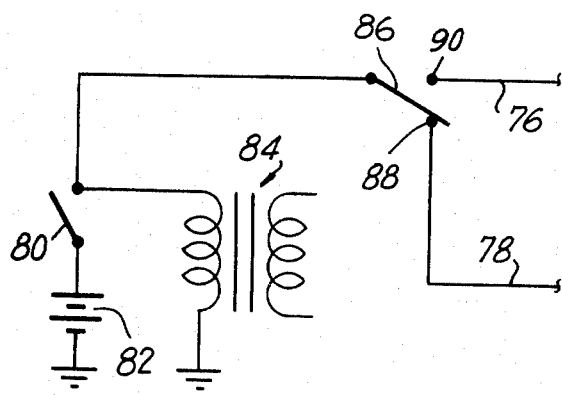
FIG. 3a is a schematic diagram of a further embodiment of automotive signaling system of the present invention.
Figure 3B:
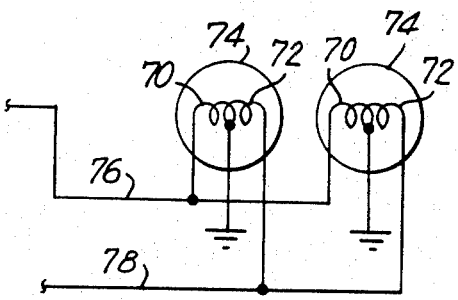
FIG. 3b is a schematic diagram of a dual filament element used with the automotive signaling system of the present invention.

In the schematic diagrams of FIGS. 3a and 3b, the pairs of warning lamps 70—70 and 72—72 are illustrated as being part of a dual filament lamp system. In particular, one filament of dual filament lamp 74 comprises one of a first pair of warning lamps 70—70 while the other filament 72 comprises one of a second pair of warning lamps 72—72. One end of filament 70 is connected to one end of filament 72 and to a point of reference potential while the other end of filament 70 is connected to receive electrical current carried by conductor 76. The other end of filament 72 is also connected to receive electrical current carried by conductor 78.

As has been described hereinabove, various embodiments are illustrated for supplying current alternately to one or the other of the signal warning lamps. As used with a dual filament lamp shown in FIG. 3b, when the ignition key is energized and the motor is running, conductor 78 will carry current to filaments 72—72 while when the accelerator mechanism is depressed, conductor 76 will carry electrical current to filaments 70—70 with the supply of current to filaments 72—72 being simultaneously interrupted. The manner in which either of conductors 76 or 78 is energized does not affect the operation of the dual filament warning lamp system illustrated. It is, of course, apparent that the dual filament elements basically are light sources which, when covered by a colored glass or lens will cause a colored visual indication to be produced. Preferably, the filaments will light to different intensities thereby indicating that a change in the condition of the motor is occurring, that is the accelerator pedal is being depressed.

FIG. 3a illustrates yet another embodiment for energizing either of conductors 76 or 78. In particular, switch 80 is operated by a suitable ignition key. One contact of switch 80 is connected through a source of power 82 to a point of reference potential while the other contact of switch 80 is connected to the ignition coil 84 of the motor. This latter contact of switch 80 is also connected to a single pole double throw switch 86 which is controlled by the position of the accelerator pedal of the automobile. In its normal position, switch 86 touches a contact 88, while when the accelerator pedal is depressed, the switch 86 abuts contact 90. When the ignition key is turned on, switch 80 is closed thereby carrying electrical current through switch 80 and through switch 86 in its normal position to contact 88, which is connected to conductor 78 in FIG. 3b. When the accelerator pedal is depressed, switch 86 abuts contact 90 and is removed from touching contact 88 thereby interrupting the flow of current to conductor 78 and allowing current to flow to conductor 76 through switches 80, 86, and contact 90.

Figure 4:
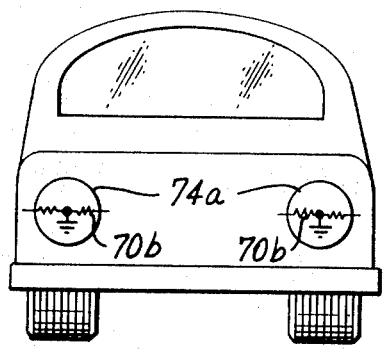
FIG. 4 is a block diagram of the rear of an automobile using a dual filament element.

FIG. 4 illustrates dual filament lamps 74a—74a being carried in the rear of an automobile thereby providing a visual indication of the motor condition in accordance with the above-described embodiments. It is to be understood, of course, and as has been mentioned above, each filament in the dual filament will be lighted to a different intensity to provide the desired visual warning.

Figure 5:
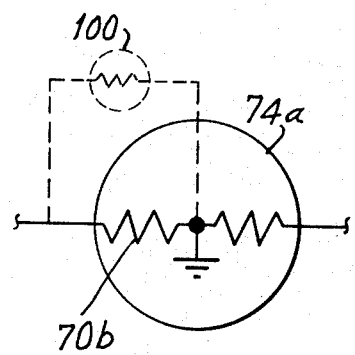
FIG. 5 is a schematic representation of another embodiment using a dual filament element.
Figure 6:
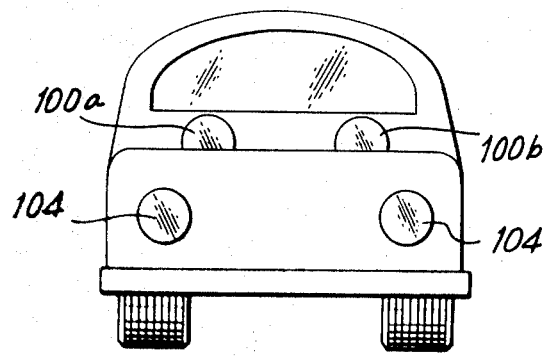
FIG. 6 is a block diagram of the rear of an automobile showing still another arrangement for the signaling lamps of the present invention.

FIG. 5 illustrates a schematic diagram for providing a multiple lamp warning system. In particular, a lamp 100 is placed in parallel across one filament 70b of the dual filament lamp so that when filament 70b is energized, lamp 100 will also be. To increase the warning effect of this lamp system, lamp 100 may be physically separated from the dual filament lamp 74a and, as illustrated in FIG. 6, may be attached to and project above the upper portion of the rear surface of the automobile as indicated by lamps 100a and 100b. Where desired, a dual filament lamp need not be utilized and when the motor is running, lamps 104—104 are energized, while when the accelerator pedal is depressed, lamps 100a and 100b are energized to the exclusion of lamps 104—104.

From the foregoing it is seen that the present invention provides a unique and greatly improved automotive signal warning system which fully accomplishes its intended objects and is well adapted to meet practical conditions of manufacture, installation, maintenance and use, and which can be attached to any part of the gas accelerator linkage, or built into the gas pedal or into the carburetor, etc.

Although the present invention has been described in some detail by way of illustration and example for purposes of clarity of understanding, it is understood that certain changes and modifications may be made within the spirit of the invention and scope of protection obtained by reason of this patent application.

I claim:

1. In combination with a vehicle and associated engine, an ignition switch and accelerator, and a tail light system providing a visual warning or indication of the engine's condition of operation to one disposed rearwardly of said vehicle comprising:
   a. at least a pair of rearwardly facing tail light sources comprising the vehicle's source of tail light illumination;
   b. said tail light sources each comprising a dual filament bulb having first and second filament elements;
   c. means for electrically coupling said filament elements of each of said dual filament bulbs to said ignition switch and responsive to said accelerator and having a first and second position;
   d. said coupling means is in said first position when said accelerator is inoperative and connects said first filament elements to said ignition switch such that said first filament elements are illuminated when said ignition switch is on and, with said accelerator in operation, said coupling means in response thereto is in said second position such that said second filament elements of each of said dual filaments bulbs are illuminated thereby turning off said first filament elements, such that when said first filament elements are on there is an indication only that said ignition switch is on and when said second filament elements are on there is an indication only that said ignition switch is on and said accelerator is supplying fuel to said engine of said vehicle such that when said accelerator is inoperative and said vehicle is moving there is provided, by the change of illumination from said first and second filaments of said dual filament bulbs, an effect indicating that the operating condition of said vehicle has changed;
   e. the change of illumination of said filaments of said dual filament bulbs is such to effect a different intensity between said first and second filaments when said accelerator is activated from an inoperative to operative position and vice-versa, thereby providing the visual warning or indication of a change in the engine's condition of operation to one disposed rearwardly of said vehicle.

2. The combination according to claim 1, wherein the effect of creating said different intensity is caused by the illumination of said second filament elements of said dual filament bulbs, and the simultaneous illumination of a second pair of tail lights each being connected in parallel across said second filament elements so as to be illuminated along with said second filament elements when said ignition switch is on thereby increasing the warning effect of the tail light system.

3. The combination according to claim 2, wherein said second pair of tail lights are physically separated from said dual filament bulbs.

* * * * *